No. 761,330. PATENTED MAY 31, 1904.
J. F. STEWARD.
MOWING MACHINE.
APPLICATION FILED MAY 15, 1903.
NO MODEL. 2 SHEETS—SHEET 2.
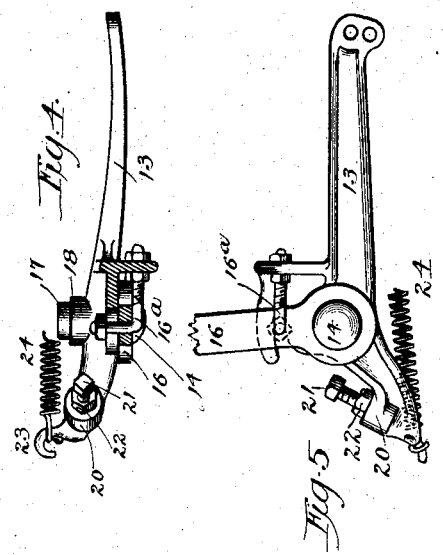
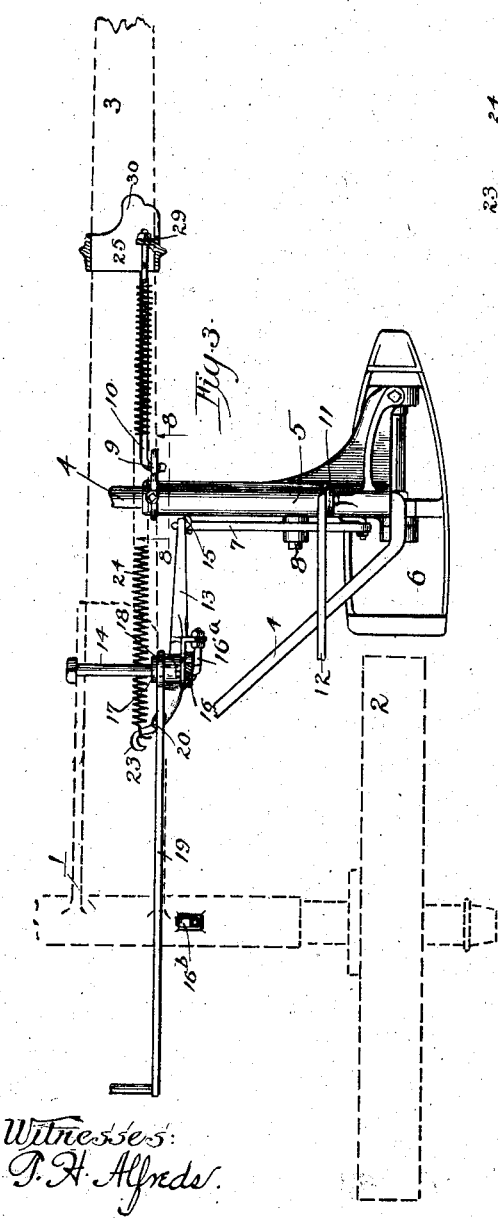
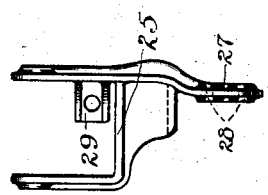
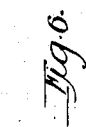
Witnesses:
T. H. Alfreds.
J. C. Warnes.
Inventor:
John F. Steward No. 761,330. Patented May 31, 1904.

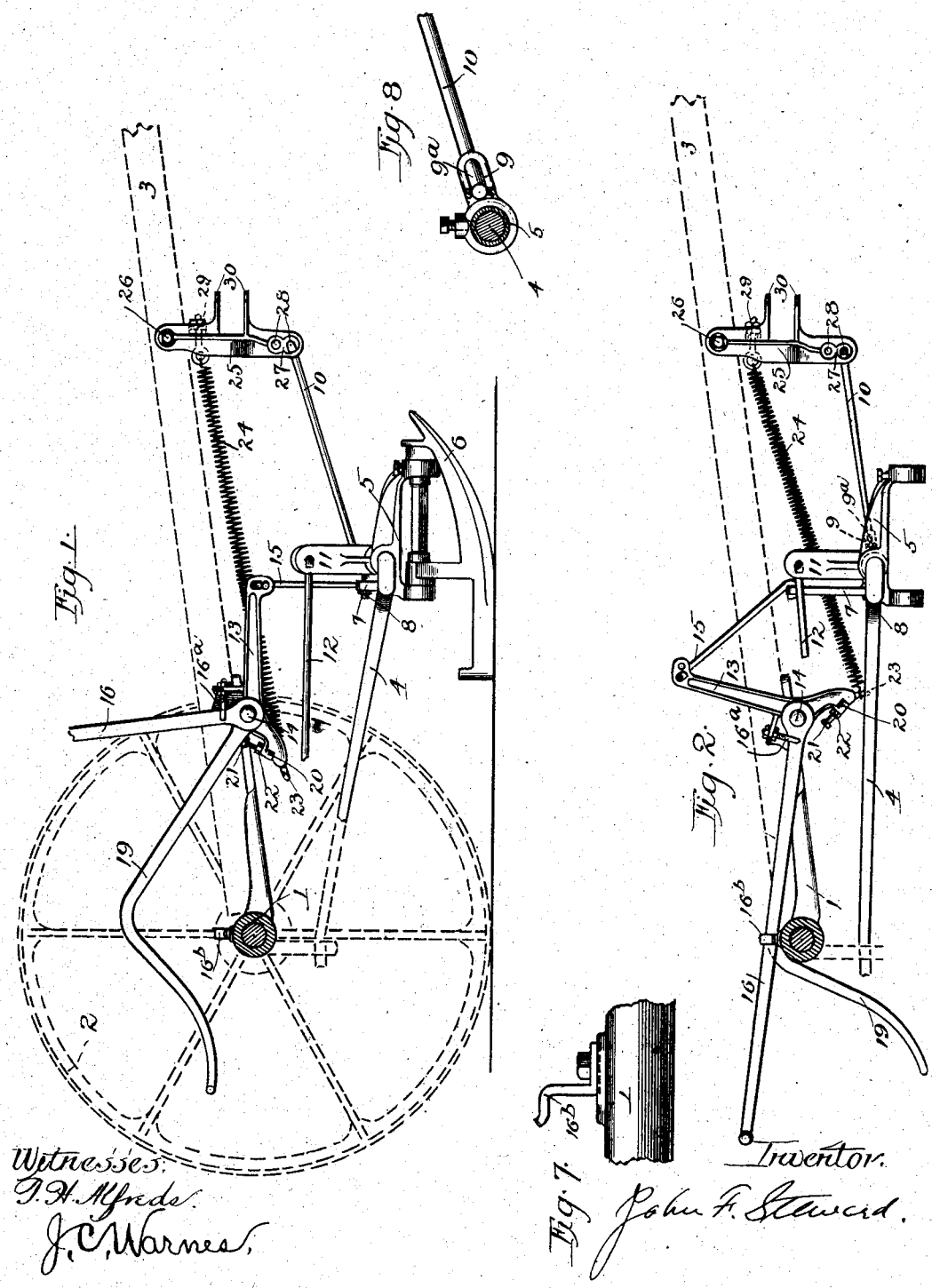

UNITED STATES PATENT OFFICE.

JOHN F. STEWARD, OF CHICAGO, ILLINOIS, ASSIGNOR TO INTERNATIONAL HARVESTER COMPANY, A CORPORATION OF NEW JERSEY.

MOWING-MACHINE.

SPECIFICATION forming part of Letters Patent No. 761,330, dated May 31, 1904.

Application filed May 15, 1903. Serial No. 157,231. (No model.)

*To all whom it may concern:*

Be it known that I, JOHN F. STEWARD, a citizen of the United States, residing at Chicago, in the county of Cook and State of Illinois, have invented a certain new and useful Improvement in Mowing-Machines, of which the following is a complete specification.

This invention relates to means for controlling the cutting apparatus of mowing-machines; and it consists, essentially, in arranging a spring to serve the double function of counterbalancing the cutting apparatus and also operating as an elastic connection between the draft-iron and the cutting apparatus. The end in view in the above arrangement is to lessen the number of working parts without impairing the efficiency of their operation.

Referring to the drawings, Figure 1 represents a side elevation of a mowing-machine, the tongue and wheels thereof being shown in dotted lines. Fig. 2 is a view similar to Fig. 1, but with the lifting-lever depressed to correspond with the cutting apparatus in its raised position. Fig. 3 is a corresponding plan of the parts shown in Fig. 1. Fig. 4 represents a plan of the lifting-lever bell-crank, and Fig. 5 an elevation of same. Fig. 6 is a rear elevation of the draft-iron. Fig. 7 is a rear elevation of a fragment of the main frame, showing the hook or catch secured thereto, by means of which the hand-lever is held in its depressed position. Fig. 8 is a section taken on the line 8 8 of Fig. 3.

In the drawings, 1 designates the frame of the mower, 2 one of the main supporting-wheels, (shown in dotted lines,) and 3 the tongue, which may be regarded as forming a portion of the main frame and which is also shown in dotted lines.

4 designates the coupling-frame pivotally secured to the main frame of the mower; 5, the yoke sleeved upon the forward member of said coupling-frame and adapted to oscillate to a limited extent thereon, the object being to permit the shoe 6, which is hinge-connected thereto, to follow the slight undulations of the ground over which the machine moves. The gag-lever 7 rocks on the stud-bearing 8 on the rear side of and integral with the said yoke 5.

Forwardly and upwardly from the sleeve of the yoke 5 extends the slotted lug 9, the slot 9ª therein adapted to receive the bent end of the draft-rod 10, as shown in Figs. 3 and 8. Instead of the slot 9ª and the draft-rod 10, as shown, a chain could be substituted therefor, as it is evident any flexible inextensible connection would serve equally as well, and, in fact, it would be possible to dispense with this member altogether.

11 is an upwardly-extending lug as one piece with the yoke, the end thereof engaging with the rod 12, which connects with the tilting-lever in the usual well-known manner.

13 is the bell-crank, supported upon the main frame of the machine by means of the bolt 14. The forward arm of the bell-crank 13 connects with the stubbleward end of the gag-lever through the link 15, and by these parts, in connection with the hand-lever 16, which is adjustably secured to the bell-crank, the height of the cutting apparatus is controlled. The adjustment between the said hand-lever and the bell-crank is made by means of the yoke-bolt 16ª, as shown in Figs. 4 and 5.

Sleeved upon the hub 17 of the bell-crank and abutting the shoulder 18 thereon is the foot-lever 19, which operates as an auxiliary lever in raising the cutting apparatus. This foot-lever 19 has a limited range independent of the hand-lever 16 and the bell-crank 13. The effect of this arrangement will be to allow the cutting apparatus to be raised by the foot-lever a portion of the distance or until the foot-lever has reached the limit of its movement. The foot-lever then remains stationary, and the balance of the operation is accomplished by means of the hand-lever 16. The hand-lever 16 is secured in its limiting position rearwardly by means of the catch 16ᵇ, which is preferably bolted to the main frame of the machine, as shown in detail in Fig. 7. On the downwardly and rearwardly projecting arm of the bell-crank is the lug 20, adapted to receive the set-screw 21, which constitutes an adjustable stop that determines the height at which the foot-lever 19 may be set. By turning this set-screw 21 the height, and consequently the scope, of the foot-lever can be regulated. 22 is a jam-nut on the set-screw 21, serving the usual function of such nuts. Engaging a laterally-disposed hook 23 on this same arm and extending forwardly therefrom is the counterbalancing-spring 24, a threaded rod on the forward end of which is engaged by the aperture in the lug 29 on the draft-iron 25. By connecting this spring to the draft-iron at a point intermediate of the evener attachment thereto and the pivotal connection of the draft-iron with the frame or tongue of the mower the said draft device will be subjected to a stress varying from the stress applied to the counterbalancing-spring. This draft-iron 25 is shown yoke-shaped in form, and the arms thereof embrace the tongue, with which it forms, preferably, a pivotal connection. The connection in this instance is of a pivotal form, the pivotal axis being formed by the bolt 26. Should the draft-iron be adapted to move longitudinally along the tongue in suitable guides, the result would be the same and still conform to the spirit of the invention. The downwardly-projecting arm 27 of the said yoke is provided with apertures 28, either one of which may engage the draft-rod 10. The plurality of apertures, as is well understood, affords means of adjusting the effective pull of the draft-iron upon the draft-rod. 29 is a lug formed integral with the draft-iron 25 and furnishes means for connecting the spring 24 therewith. To the forwardly-projecting lugs 30 is attached the doubletrees. (Not shown.)

In the construction above described it is apparent that the normal position of the several parts when the pull of the team is removed from the draft-iron will be as shown in Fig. 1. When the pull of the team is suddenly applied to the draft-iron 25, the spring 24 will yield and reduce the shock that would otherwise be received upon the shoulders of the horses. The spring in yielding will accordingly be extended, and the bent end of the rod which engages the slot 9ª will move to its forward limit therein and the usual counterbalancing effect be given to the cutting apparatus. The spring 24 thus operates to counterbalance the cutting apparatus, as well as to serve as yielding connection to a limited extent between the cutting apparatus and the draft-iron.

What I claim as my invention, and desire to secure by Letters Patent, is—

1. In a mowing-machine having the usual draft-tongue, in combination, the cutting apparatus, the lifting mechanism, a draft-iron pivotally secured to and depending from the tongue of the mower, means for attaching a draft device thereto, a spring interposed between the said lifting mechanism and the draft-iron, the securement of the said spring being made to the draft-iron at a point intermediate of the evener attachment thereto and the pivotal connection thereof with said draft-tongue substantially as described.

2. In a mowing-machine, in combination, the cutting apparatus, the lifting mechanism, a draft-iron pivotally secured to and depending from the frame of the mower, means for attaching an evener thereto, means extensible longitudinally to a limited amount secured to the free end of said draft-iron and extending to and connecting with the cutting apparatus, a spring interposed between the said lifting mechanism and the draft-iron, the securement of the said spring being made to the draft-iron at a point intermediate of the evener attachment thereto and the pivotal connections thereof with the mower-frame substantially as described.

3. In a mowing-machine, in combination the cutting apparatus, the lifting mechanism, a draft-iron pivotally secured to and depending from the frame of the mower, means for attaching the evener thereto, a forwardly-projecting lug on said cutting apparatus provided with a slot, a draft-rod adjustably secured to the free end of said draft-iron and extending to and engaged by the slot in said lug, a spring interposed between the said lifting mechanism and the draft-iron, the securement of the said spring being made to the draft-iron at a point intermediate of the evener attachment thereto and the pivotal connection thereof with the mower-frame substantially as described.

4. In a mowing-machine, in combination the cutting apparatus, the lifting mechanism, a draft-iron pivotally secured to and depending from the frame of the mower, means for attaching an evener thereto, means extensible longitudinally to a limited amount secured to the said draft-iron and extending to and connecting with the cutting apparatus, a spring interposed between the said lifting mechanism and the draft-iron, the securement of the said spring being made to the draft-iron at a point intermediate of the evener attachment thereto and the pivotal connections thereof with the mower-frame substantially as described.

JOHN F. STEWARD.

In presence of—
D. E. LOCKERT,
J. C. WARNER.